United States Patent
Gerber et al.

(10) Patent No.: US 6,373,209 B1
(45) Date of Patent: Apr. 16, 2002

(54) STEPPING MOTOR WITH AN ELECTRICAL ACTIVATION CIRCUIT AND ARRANGEMENT WITH A STEPPING MOTOR

(75) Inventors: Georges Gerber, Tramelan; Olivier Gaeumann, Neuchatel; Pierre-Yves Monneron, Niederwangen, all of (CH)

(73) Assignee: Ascom AG, Bern (CH)

( * ) Notice: Subject to any disclaimer, the term of this patent is extended or adjusted under 35 U.S.C. 154(b) by 0 days.

(21) Appl. No.: 09/547,798

(22) Filed: Apr. 12, 2000

(30) Foreign Application Priority Data

Apr. 12, 1999 (EP) .............................. 99810303

(51) Int. Cl.$^7$ ................................. H02P 8/24
(52) U.S. Cl. ................. 318/379; 318/380; 318/696; 318/685
(58) Field of Search ................. 318/685, 696, 318/254, 701, 373, 375, 379, 380, 381

(56) References Cited

U.S. PATENT DOCUMENTS 4,486,696 A  * 12/1984 Matsushita et al. ......... 318/696
5,117,171 A  *  5/1992 Bonss ........................ 318/696
6,002,225 A  * 12/1999 Gleim et al. ................ 318/373
6,100,662 A  *  8/2000 Hansen ....................... 318/685

FOREIGN PATENT DOCUMENTS

| DE | A1-3326358 | 1/1984 |
| DE | A1-4022637 | 1/1992 |
| EP | A1367693 | 5/1990 |
| EP | A2583724 | 2/1994 |

OTHER PUBLICATIONS

Patent Abstract of Japan, vol. 96, No. 7, 08 067382, Mar. 12, 1996.

* cited by examiner

Primary Examiner—Bentsu Ro

(57) ABSTRACT

A stepping motor with an electrical activation circuit for electrical control of its exciter windings, is made as a driving motor and also as a braking motor with an adjustable braking action. The predefinable braking action is achieved passively without any current feed into the exciter windings. For this purpose a stipulated impedance with an adjustable duty factor can be connected to each exciter winding. One such stepping motor that is controlled in its braking action is used in an arrangement in which a strip or filament material can be transported braked from a storage.

14 Claims, 2 Drawing Sheets

STEPPING MOTOR WITH AN ELECTRICAL ACTIVATION CIRCUIT AND ARRANGEMENT WITH A STEPPING MOTOR

BACKGROUND OF THE INVENTION

TECHNICAL DOMAIN

The invention relates to a stepping motor and an arrangement with a stepping motor.

SUMMARY OF THE INVENTION

The object of the invention is to devise a stepping motor with simple electrical control which has adjustable braking behavior and to use this stepping motor in an arrangement for winding and/or unwinding of strip or filament material.

The aforementioned object is achieved in that a stipulated resistance with a duty factor can be applied to each exciter winding and can be turned off in order to achieve a predetermined braking variation depending on the rpm of the motor. This process is done in addition to having a controllable current flow through the exciter windings of a stepping motor to its drive with an activation circuit. This is done passively without any feed of an external current through each exciter winding with the activation circuit.

BRIEF DESCRIPTION OF THE DRAWINGS

In the following, examples of the stepping motor and its use are detailed with reference to the figures in the drawings.

DETAILED DESCRIPTION OF THE INVENTION

Figure 1:
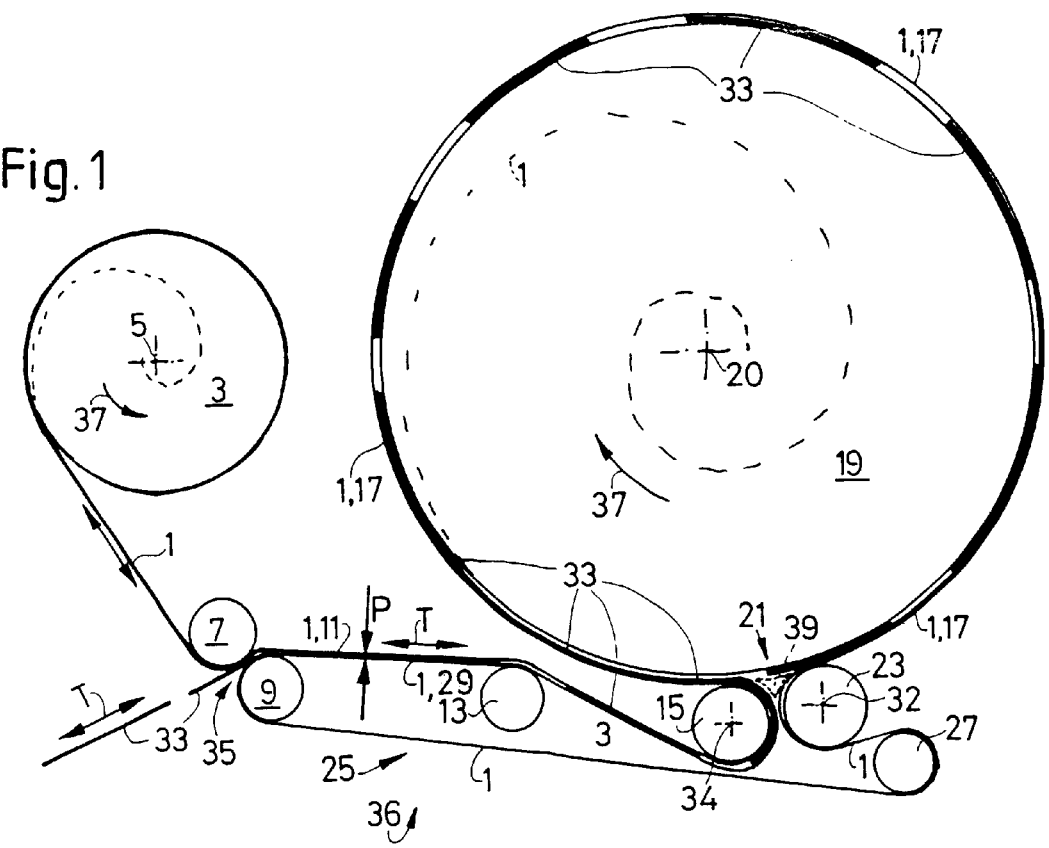
FIG. 1 shows a schematic of an arrangement with sample use of the stepping motor, in accordance with the systems and methods of the invention.

FIG. 1 shows a schematic of an arrangement with two (not explicitly shown) stepping motors which are made the same, which are described below, and which are activated as claimed in the invention. The arrangement shown here is used for winding and unwinding of a strip or filament material, here a so-called storage strip 1. For example, with this storage strip 1 the rolling on and rolling off of sheet-shaped articles, i.e. bank notes 33, is done. In FIG. 1 the thickness ratios of the bank notes which are to be stored on a storage reel 19 as winding storage and the storage strip 1 are shown greatly exaggerated.

FIG. 1 shows a side view of the arrangement. The end of a single storage strip 1 which is one-piece in the transport direction T is attached to the strip reserve reel 3. The storage strip 1 can be wound onto and off of the strip reserve reel 3. The strip reserve reel 3 can be turned around its axle 5. One of the stepping motors described below acts on the axle 5. From the strip reserve reel 3, the storage strip 1 runs via a deflection roller 7 which is located opposite a pressure roller 9. From the deflection roller 7, the route of the storage strip 1, called the second strip part 11, runs via a tension roller 13, as the storage strip squeezing element, to a deflection roller 15, as the storage strip deflection element. After deflection, the storage strip 1, as the third strip part 17, runs outside on a storage reel 19. The deflection reel 15 is pressed against the respectively uppermost position (third strip part) of the storage strip 1 on the storage reel 19 and is thus driven via the storage reel 1. The storage reel 19 can turn around a stationary axle 20 which can be driven and also braked with another stepping motor. The strip part 17, labelled as the strip part 22, runs, except for a loop-out region 21, outside on the periphery of the storage reel 19 and is then routed away from the periphery with another deflection roller 23 as the deflection element. This deflection roller 23 also runs analogously to the deflection roller 15 pressed to the outside against the wound storage strip 1. From this deflection roller 23 the storage strip 1 runs as a loop 25 via another deflection roller 27 to the pressure roller 9. Following this pressure roller 9, together with the second strip part 11, it is routed underneath the latter as the first strip part 29 via the tension roller 13 and the deflection roller 15 to the storage reel 19. On the storage reel 19, it then runs underneath the strip part 17 as the fourth strip part 31 and is then ultimately attached after several turns, which are shown here schematically in broken lines, in the vicinity of the axle 20 in the storage reel 19.

A single strip in the winding direction is defined as simply one strip 1 which proceeds from one location, here a strip reserve reel 3, and ends on a storage reel 19. Between the turns on the storage reel 19, the bank notes 33 are held. In the direction of width, perpendicular to the transport direction, there can be several strips running preferably parallel to one another.

Although, in the transport direction, only a single storage strip 1 is used. The bank notes 33 are still transported between two strip parts as a result of loop formation. This yields extremely reliable transport.

The diameter of the storage reel 19 changes when the bank notes are being rolled on and off as a result of the winding and unwinding of the storage strip 1 with the notes 33 located in between. The two deflection rollers 15 and 23 should always be as close to one another as possible (loop-out area 21 as small as possible) and should be as near as possible to the changing periphery of the storage reel 19, preferably on it. To achieve this, the distance of the axles 32 and 34 of the two deflection rollers 23 and 15 is made variable relative to the axle 20 of the storage reel 19 depending on the changing storage reel diameter. In the embodiment described here by way of example, the axle 20 is chosen to be rigid in its position. The axles 15 and 32 are joined stationary to one another at a distance and are pressed by spring force against the jacket of the storage reel 1. The compressive force P necessary for reliable holding of the bank notes between the strip parts 11 and 29 with the tensioning roller 13 together with the adjustable braking behavior described below for the stepping motor which acts on the axle 5 when the bank notes 33 are being rolled on the storage reel 19. When rolling off, the stepping motor acts on the axle 20 as a drive motor, when rolling on it acts as the braking motor. The deflection rollers 7, 15, 23 and 27, the pressure roller 9, the tension roller 13 and the strip loop 25 define a guide unit 36 in the storage strip inlet area to the storage reel 19.

To roll on sheet-like flexible objects, especially bank notes, they are generally brought to an insertion or outlet slot 35 with a belt conveyor (which is not shown). The slot 35 is formed from the strip parts which run over the deflection roller 7 and the pressure roller 9. The objects 33 are now transported clamped between the two strip parts. Clamping during transport is effected by the deflection of the tension roller 13 transversely to the transport direction T. Since the location of the two deflection rollers 15 and 23 changes when rolling objects on or off, the tension of the tension roller 13 must also be changed by its displacement, since the axle 5 of the strip reserve reel 5 has been chosen to be fixed.

The loop-out area 21 should be chosen to be as narrow as possible so that the jacket section becomes smaller than the smallest width of the wound objects 33 which are described below, i.e., the bank notes. The objects 33 are "pre-bent" by an almost complete revolution on the jacket of the storage reel 19. Advantageously the free jacket periphery will be limited to one third of the object width.

FIG. 1, only one storage strip is visible in the side view transversely to the transport direction T. Depending on the transverse extension of the objects 33 to be transported, several storage strips 1 are used, generally at least two.

The changing peripheral difference of the storage reel 19 is also captured by the arrangement with a braking stepping motor.

The rolling-on bank notes 33 is preferably monitored for optimum usage of storage space on the storage reel 19 using sensors (which are not shown). There can now be one optical sensor before the insertion/output slot 35;. it monitors the distance of the arriving bank notes 33 to one another. Depending on the distance of the bank notes 33, the drive for the storage reel 19 is turned on or off via a control which is not shown. There is reliable storage of the objects 33 on the periphery of the storage reel 19. Therefore the storage reel 19 is always driven until the "last" bank note 33 is wound on the storage reel jacket. Thus, for renewed rolling-on, a peripheral length which corresponds to the strip path from site 35 approximately to the site of the deflection roller 15 would be "lost". To prevent this loss of storage before each new rolling-on, the storage strip is pulled back until the "last" bank note 33 is again in the immediate vicinity of the deflection roller 7 or the pressure roller 13. The "pullback path" is preferably monitored with another sensor which is located in the immediate vicinity of the deflection roller 7 or the pressure roller.

Based on a bending effect, the bank notes adhere well to the periphery of the storage reel 19 since they are bent during almost one complete revolution. This adherence effect is furthermore intensified by a certain static charging in a storage strip 1 of electrically insulating material and likewise electrically nonconductive bank notes. For very dirty and/or "limp" bank notes 33, however, this adhesion can be greatly reduced. To prevent extremely improbable lifting of the bank notes 33 in the loop-out area 21, there can be a gusset-like guide element 39 which is shown in cross section in FIG. 1 by the broken line there.

Preferably two deflection rollers 15 and 23 are used. But only a single one can also be used when the storage strip 1 at one site is tangentially moved away or towards the storage reel 19. Tangentially guiding the storage strip away in an embodiment which does not have strip loop is shown in FIG. 6.

Figure 2:
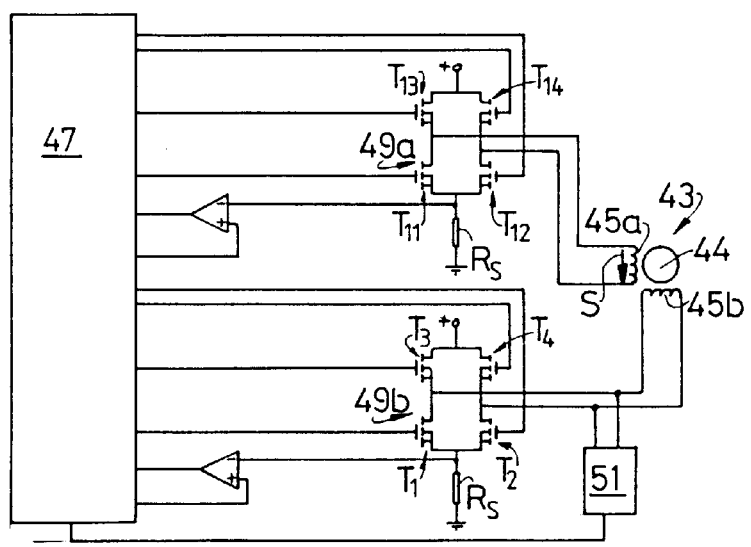
FIG. 2 shows an activation circuit for a stepping motor which acts with a predefinable variation of the braking force, in accordance with the systems and methods of the invention.

A stepping motor 43 which acts on the axles 5 and 20 in a driving or braking mode is operated by the circuit which is shown in the diagram in FIG. 2. Schematically the stepping motor 43 is shown here simply by its rotor 44 which has a permanent magnet and the two exciter windings 45a and 45b which are locally offset by 90° to one another and which can also be made as pairs of windings opposite one another. The exciter windings 45a and 45b are excited as controlled via an activation circuit 46. The activation circuit 46 has a microprocessor 47 which supplies power accordingly to the transistors T1 to T4 and T11 to T14 of two transistor bridge circuits 49a and 49b. If for example the two transistors T12 and T13 are conductive, in the exciter coil 45a current flows in direction S. A circuit which controls only the exciter windings 45a and 45b in the motorized driving mode is known.

Figure 3:
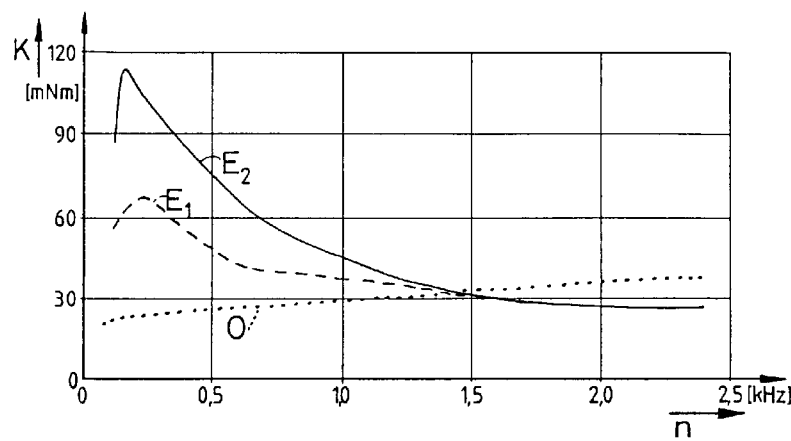
FIG. 3 shows the variation of the braking force in known activation of stepping motors, in accordance with the systems and methods of the invention.

To brake a stepping motor, to date one or two exciter windings 45a and 45b had been short circuited. This braking behavior is shown in FIG. 3, the Y axis plotting the braking force K and the X axis plotting the rotational speed n. The curve 0 shows the braking behavior of an unexcited stepping motor with open exciter windings. The braking force K which rises towards high rotational speeds n is effected by friction forces, air resistance, hysteresis losses, eddy current losses . . . A stepping motor with rotor drive from the outside (braking) acts as a generator. I.e. a current which runs sinusoidally over time is induced in its exciter windings. If one of the two exciter windings 45a or 45b is now shorted, the braking behavior according to curve E1 results. If the two exciter windings are shorted, the braking action according to curve E2 is higher. In both cases at low rpm n the braking action is high and then decreases almost exponentially towards high rpm n.

Now no longer one, but two or no exciter windings are shorted as claimed in the invention. The exciter winding is short circuited in a controlled manner. To do this a circuit as shown in FIG. 2 is used. A switching unit 51 which is shown in FIG. 2 is not used in the activation described below. The exciter windings 45a and 45b are now shorted in a controlled manner. Short circuiting takes place here for example with a clock frequency of 16 kHz. The braking behavior of the stepping motor depends little on the chosen clock frequency (100 Hz to 100 kHz and higher). The exciter winding is shorted by connecting the two transistors T11 and T12 to be conductive and connecting the two transistors T13 to T14 to be blocked. Analogously transistors T1 to T4 are switched for the exciter winding 45b. In contrast to the known process, at this point this short circuiting does not occur continuously during the braking process, but with the aforementioned clock frequency and an adjustable duty factor. A "short circuit impedance" R is formed by the internal resistance of the two transistors T11 and T12 and T1 and T2.

Figure 4:
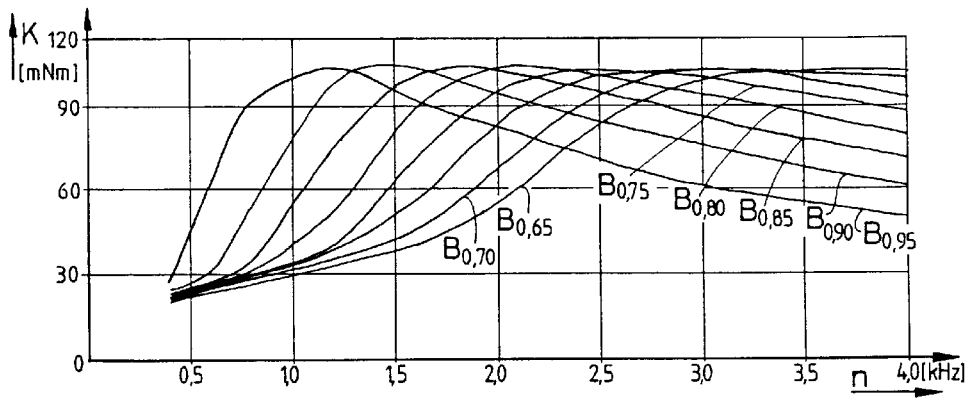
FIG. 4 shows the variation of the braking force in activation of the stepping motors, in accordance with the systems and methods of the invention.

The resulting curves are shown in FIG. 4 by way of example for a stepping motor of type 6600 from the company Sonceboz. Other stepping motors of course yield different curves. The characteristic braking behavior shown here however is preserved. The braking variation curves $B_{0.95}$ to $B_{0.65}$ shown in FIG. 4 characterize a different duty factor, the subscript showing the duty factor in each case. Thus 0.95 means that the short circuit impedance R is connected for 95% of the period duration. I.e. only during 5% of the braking time is the induced current glow through the exciter coils 45a and 45b interrupted. Comparison of the curve $B_{0.95}$ to waveforms E1 and E2 yield low similarity. If at this point the duty factor is further reduced, the braking peak is surprisingly shifted to higher rpm. The drop of braking action also becomes smaller. By experimental optimum adjustment of the braking action with a corresponding choice of the duty factor, the desired braking action can be set, especially in the above cited example of the bank note storage. Here as a result of the easily adjustable braking action, sufficient tension of the storage strip 1 can always be ensured. The duty factor can be set extremely easily. It is not necessary to monitor the angle of rotation of the rotor.

Use of the switching unit 51 which is present in FIG. 2 represents a more complex circuit version to the above description. The switching unit 51 is used to determine the zero passage of the current induced in the exciter coils 45a and 45b. With adjustable delay at this point the induced current after passing through zero is loaded with short circuit impedance R. The duty factor can be easily set since the respective zero passages which determine the period duration for the current induced in the exciter windings can be ascertained. The period duration changes during braking. However the changes are small per period, so that one preceding period at a time can be used by the microprocessor 47 to redefine the duty factor without a noticeable error occurring.

Instead of setting the time shift of the starting instant with the microprocessor 47, to change the duty factor a variable current threshold of the induced current can also be used.

Figure 5:
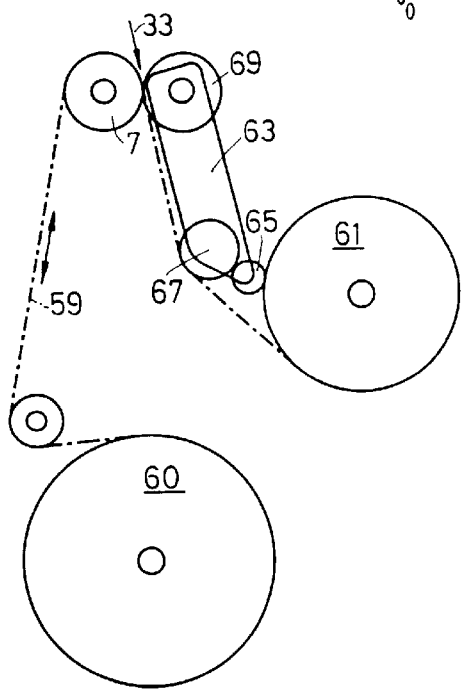
FIG. 5 shows one version of the arrangement which is shown in FIG. 1, in accordance with the systems and methods of the invention.

The guide unit 36 in the storage strip entry area need not take place, as shown in FIG. 1, with a loop 25. As shown in FIG. 5, a loop need not be used. The storage strip 59 then proceeds from a strip reserve reel to a storage reel 60 or 61. Before entry of the storage strip into the storage reel 61, likewise in the storage strip entry area, there is a guide unit 63 which presses against the storage strip surface and which has a roller 65 analogously to the roller 15 which runs on the surface of the storage roller. There are furthermore a deflection roller 67 and a roller 69 which is analogous to the pressure roller 9.

Use of a driving stepping motor with a braking stepping motor which is made according to the aforementioned is not limited to rolling bank notes on and off. One such arrangement can be preferably used wherever strip or filament material is to be wound and unwound under tension. The above explained circuit can be used wherever stepping motors must be braked in a controlled manner.

The above described storage device is preferably used in automatic cash machines, preferably in automatic teller machines. Instead of bank notes, other flexible sheet-shaped objects such as checks, type plates, labels, packing slips, .. can be rolled on and off. The objects 33 need not have the same dimensions. It must simply be watched that a minimum transverse dimension which is given by the loop-out area 21 always be reached.

Instead of having the two stepping motors act on the axles of the strip reserve reel 3 and 60 and of the storage reel 19 and 61, the stepping motor can act by driving and braking also via friction on the jacket of the reels, i.e. on the strip which is to be wound and unwound. Frictional engagement however can also reduce the service life of the strip. But it is advantageous that both the braking and the driving motor can work with the same rotational velocity even as the diameter of the winding storage changes. Setting of the braking behavior, especially of the duty factor, can take place then as a function of the stipulated pulse frequencies of the driving stepping motor.

Instead of applying the above described braking process to the two exciter windings, only a single one can also be activated. Each exciter winding can also have two winding packs which can be separated from one another and only one at a time controlled in this way.

"Braking switching" can also be done in a motor located in a drive in order to achieve damping of its resonant behavior. Assuming the resonant state can be clearly recognized from the current by the current flow through the exciter windings. A corresponding braking pulse with a correspondingly set duty factor can now follow one exciter pulse at a time for "damping". One braking pulse can also follow several exciter pulses and vice versa. Switching between excitation and braking is easily possible by the circuit which is shown in FIG. 2; only transistors T1 to T4 and T11 to T14 need be activated accordingly by the microprocessor 47.

Instead of winding and unwinding or rewinding a strip or a filament between two storage reels, it is also possible to unwind only from a single reel in a braked manner.

What is claimed is:

1. A stepping motor with an electrical activation circuit for electrical control of its exciter windings, characterized in that in addition to controlling current flow through the exciter windings of the stepping motor to its drive with the activation circuit, passively without any feed of an external current through each exciter winding with the activation circuit, a stipulated impedance with a duty factor can be applied to each exciter winding and can be turned off in order to achieve a predefinable braking variation depending on the rpm of the unexcited motor.

2. The stepping motor as claimed in claim 1, wherein the activation circuit has a controlled bridge circuit with which in motorized operation an exciter current can be switched through each exciter winding and with which in unexcited generator operation a current which has been induced by the rotation of the rotor of the stepping motor in the exciter windings with a predefinable clock frequency and/or a predefinable duty factor can be provided with a resistance to set the stipulated braking behavior.

3. The stepping motor as claimed in claim 2, wherein resistance is applied by the bridge circuit when an adjustable voltage threshold is exceeded for the current induced in each exciter winding in generator operation and/or with an adjustable delay after passage of the respective current through zero for adjusting the stipulated braking behavior.

4. An arrangement for braked transport of strip or filament material in the lengthwise direction of the strip from a storage which stores this material, and braking with a predefinable braking force can be done with a stepping motor which acts on the material and which has an electrical activation circuit as claimed in claim 3, in which passively without any feed of an external current a stipulated impedance with a predefinable duty factor can be applied to at least one of the exciter windings by means of the activation circuit and can be turned off.

5. The stepping motor as claimed in claim 2, wherein with the bridge circuit both a exciting current can be switched through the respective exciter winding and then an induction current of the respective exciter coil can be supplied with an impedance so that controlled damping of the resonance of the stepping motor can be done.

6. An arrangement for braked transport of strip or filament material in the lengthwise direction of the strip from a storage which stores this material, and braking with a predefinable braking force can be done with a stepping motor which acts on the material and which has an electrical activation circuit as claimed in claim 5, wherein passively without any feed of an external current a stipulated impedance with a predefinable duty factor can be applied to at least one of the exciter windings by means of the activation circuit and can be turned off.

7. An arrangement for braked transport of strip or filament material in the lengthwise direction of the strip from a storage which stores this material, and braking with a predefinable braking force can be done with a stepping motor which acts on the material and which has an electrical activation circuit as claimed in claim 2, wherein passively without any feed of an external current a stipulated impedance with a predefinable duty factor can be applied to at least one of the exciter windings by means of the activation circuit and can be turned off.

8. An arrangement for braked transport of strip or filament material in the lengthwise direction of the strip from a storage which stores this material, and braking with a predefinable braking force can be done with a stepping motor which acts on the material and which has an electrical activation circuit as claimed in claim 1, in which passively without any feed of an external current a stipulated impedance (R) with a predefinable duty factor can be applied to at least one of the exciter windings by means of the activation circuit and can be turned off.

9. The arrangement as claimed in claim 8, wherein the stepping motor can be switched to drive action and to braking action with the activation circuit, as the storage for the strip or filament material there is one winding storage each, from which it can be wound on and off, one of the stepping motors acts on each winding storage and the braking action of the stepping motor which interacts with the winding storage and from which the material is to be unwound can be stipulated such that the material remains tensioned with a tension which is constant except for a tolerance.

10. The arrangement as claimed in claim 9, wherein the strip or filament material is a storage strip and one of the two winding storages is a storage reel and the other winding storage is a strip reverse reel, and in the storage strip inlet area to the storage reel there is a guide unit which presses against the storage strip surface with a retraction/output means for sheet-shaped objects, which are used to transfer objects so that they can be rolled on and off the storage reel between the storage strip layers.

11. The arrangement as claimed in claim 8, wherein the strip or filament material is a storage strip and one of the two winding storages is a storage reel and the other winding storage is a strip reserve reel, and in the storage strip inlet area to the storage reel there is a guide unit which presses against the storage strip surface with a retraction/output means for sheet-shaped objects, which are used to transfer objects so that they can be rolled on and off the storage reel between the storage strip layers.

12. The arrangement as claimed in claim 11, wherein the guide unit has a roller which is located in the immediate vicinity of the storage strip inlet onto the reel and which unwinds on the storage reel surface, the axial distance of the roller to the storage reel axis can be changed with the storage reel diameter which changes depending on the storage strip which has been wound on and off.

13. The arrangement as claimed in claim 12, wherein a strip loop of the storage strip is routed out of the storage reel as a control unit such that one part of the loop strip as the first strip part runs parallel to a second strip part which leads to the strip reserve reel on a section of the path with a capacity to be pressed against one another by a predefinable compression force, and the combination are of the two strip parts is used as the retraction/output means and the compressive force can be achieved by the predefinable braking behavior of the stepping motor which has been switched to braking.

14. The arrangement as claimed in claim 11, wherein a strip loop of the storage strip is routed out of the storage reel as a control unit such that one part of the loop strip as the first strip part runs parallel to a second strip part which leads to the strip reserve reel on a section of the path with a capacity to be pressed against one another by a predefinable compression force, and the combination area of the two strip parts is used as the retraction/output means and the compressive force can be achieved by the predefinable braking behavior of the stepping motor which has been switched to braking.

\* \* \* \* \*